LIGHT INPUT CROSSED-GRID MATRIX CONTROL CIRCUITRY

Filed Aug. 1, 1961 2 Sheets-Sheet 1

INVENTOR.
Joseph T. McNaney

May 4, 1965 J. T. McNANEY 3,182,200

LIGHT INPUT CROSSED-GRID MATRIX CONTROL CIRCUITRY

Filed Aug. 1, 1961 2 Sheets-Sheet 2

INVENTOR.
Joseph T. McNaney

United States Patent Office 3,182,200

Patented May 4, 1965

3,182,200

LIGHT INPUT CROSSED-GRID MATRIX CONTROL CIRCUITRY

Joseph T. McNaney, 8548 Boulder Drive, La Mesa, Calif.

Filed Aug. 1, 1961, Ser. No. 128,943
8 Claims. (Cl. 250—227)

This invention relates to crossed-grid matrix control circuitry wherein an array of closely packed circuit elements may be controlled by binary input variables, and more particularly wherein an array of $N^2$ on-off circuits may be controlled by 2N light wave input functions.

The usefulness of crossed-grid control circuitry has extended into many fields in recent years. There are particular needs in the electronic computer and data display fields which depend on crossed-grid or X–Y circuit arrays for solutions to rather complex switching functions, however, due to a number of shortcomings in existing X–Y switching techniques some very real problems requiring the use of X–Y type of switching have gone unsolved.

A very important requirement in the computer field is a reduction in the size and complexity of multi-pole X–Y switch units. In response to computer commands for for the display of pictorial data some real needs exist regarding the reduction of size and complexity of present day display equipments, and regarding improvements in display contrast and brightness. Improvements of this general character are also needed in the television industry.

A principal object of the present invention is to provide a crossed-grid array of light conducting fibers, instead of the more conventional crossed-grid electrical conductors, in effecting on-off circuit functions at predetermined X–Y intersections of such arrays.

Another object is to utilize light conducting fibers of such dimensions that the utmost in small size may be achieved with a minimum of circuit cross talk.

Another object is to provide an X–Y switch which lends itself to remote positioning with respect to input controls and in close association with circuits to be controlled without the undesired effects of capacitive coupling between independent switch leads, nor the effects of capacitive coupling between switch leads and adjacent circuits.

Another object is to provide an X–Y switch which lends itself to the fabrication of electroluminescent display panels in which poor contrast resulting from cross talk between adjacent switch leads can be eliminated.

Another object is to provide crossed-grid matrix control circuitry in combination with an electroluminescent layer in a panel type display for televison receivers.

A further object is to provide an X–Y switch for use in conjunction with light producing elements of large screen television display panels.

Other objects and advantages of the invention will become apparent from the following description when taken in conjunction with the accompanying drawings in which.

The component parts of the basic invention comprise at least two light conducting fibers capable of conducting light waves along their longitudinal dimension, each having individual layers of photoconductive material adapted to be illuminated from predetermined portions of an outer surface of the fiber, whereby, the layers of photoconductive material, series connected, may singularly or in combination provide an "off" circuit function when one or both photoconductor layers are in a dark resistance state, and provide an "on" circuit function when both photoconductor layers are illuminated simultaneously.

The conduction of light waves through transparent fibers of lengths many times their diameter, due to multiple internal reflections, is well known in the art of glass optics. Light conducting materials from which such fibers have been made include quartz, glass, Lucite, nylon and the like. Light conducting fibers have been drawn to diameters of less than 0.001", and such fibers are capable of conducting light waves with a high degree of efficiency through fiber lengths of 25 feet or more. The outer surface of these fibers normally contain a fire polished surface. When such surfaces are intimately joined with an opaque material considerable light wave energy will be absorbed by this material. And, when such surfaces are intimately joined with a transparent material having a high index of refraction relative to the index of the fiber, or in a transparent environment having a relatively high index of refraction, light waves will be conducted away from the outer surface of the fiber and into the higher index material. However, light waves will be conducted through the length of a fiber having a relatively high index of refraction and a jacket having a relatively low index of refraction, or within an environment having a relatively low index of refraction. Since such fibers represent one of the basic components of the invention, all of these unique characteristics of light conducting fibers will be utilized in achieving the objectives of this invention.

Figures 1, 2, 3, 4:
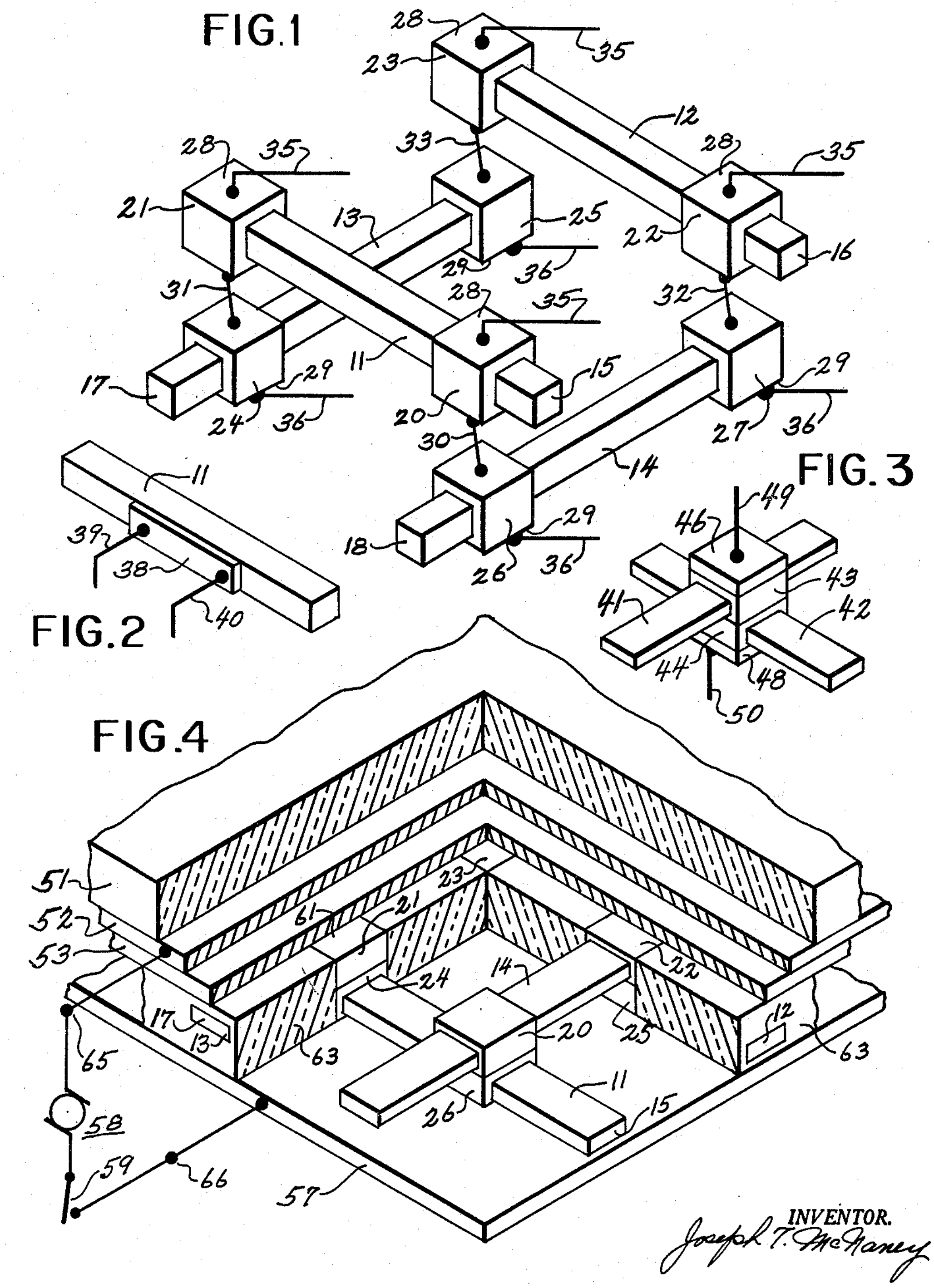
FIGURE 1 is a view in perspective of crossed-grid matrix control circuitry embodying the basic concepts of the invention utilizing but four sets of circuit control elements respectively at four X–Y intersections of the matrix.
FIGURE 2 is a fragmentary part of a switch assembly viewed in perspective.
FIGURE 3 is a view in perspective of a further embodiment of an X–Y switch intersection.
FIGURE 4 is a fragmentary view in perspective of a display panel with certain portions cut away to show its innerconstruction.

Referring now to FIGURE 1, the basic concepts of the invention have been extended to include an array of four light conducting fibers 11, 12, 13 and 14. Each of the four fibers has a longitudinal dimension exceeding its cross sectional dimension, and a transverse end presenting an end surface 15, 16, 17 and 18 adapted to receive light waves incident to said end surface. The outer surface of the fibers, generally along their longitudinal dimension, has a fire polished finish and thereby an extremely smooth surface. Two of the four fibers 11 and 12 assume a position in one plane while the remaining two fibers 13 and 14 assume a position in a different plane, defining between them four fiber crossings, or, four X–Y intersections. Layers of photoconductive material 20 through 27, such as selenium, cadmium sulphide, silver selenide, germanium, and the like materials, which hereinafter will be referred to as "PC layer," are intimately joined with predetermined portions of the outer surface of the fibers along their longitudinal dimension, coinciding with the fiber crossings. The PC layers are thereby adapted to be illuminated selectively by light waves from the outer surfaces of their respective fibers. At each of the four fiber crossings individual PC layers 20, 21, 22 and 23 of fibers 11 and 12 in one plane are connected operatively with individual PC layers 24, 25, 26 and 27 of fibers 13 and 14 in the other plane, thereby providing four interconnected pairs of PC layers. For example, PC layers 20 and 26 are interconnected by a conductor 30; PC layers 21 and 24 by conductor 31; PC layers 22 and 27 by conductor 32; and PC layers 23 and 25 by conductor 33.

In their dark resistance state each of the four interconnected pairs of PC layers referred to provide four relatively high resistance series circuits between surfaces at opposite ends of each pair. Operatively connected with opposite ends 28 and 29 of each pair are supplementary conductors 35 and 36. The addition of these conductors 35 and 36 to said opposite ends, permit the array of light sensitive switches to be utilized as remotely located circuit control elements. A predetermined pair of PC layers will be converted to a relatively low resistance series circuit between conductors 35 and 36 when light is permitted to enter end surfaces of predetermined X and Y oriented fibers of the array. For example, a single pair of PC layers 23 and 25 will be changed from an "off" circuit function to an "on" circuit function when light is admitted to end surfaces 16 and 17 simultaneously, leaving the remaining series circuits of the array in their "off" condition. Although PC layer 22 will have been illuminated by light entering end surface 16 and thereby converted to a relatively low resistance, the non-illuminated PC layer 27 will have prevented this particular series circuit of PC layers 22 and 27 from being converted to an "on" circuit function. The same thing will have also been true of the series circuit of PC layers 21 and 24.

Although the embodiment of the invention shown and described in conjunction with FIGURE 1 contains but four X–Y intersection on-off circuits, involving four light conducting fibers, the invention is certainly not limited in this respect. Depending upon application requirements, such an array may, for example, contain 256 X–Y intersection on-off circuits under the control of 16 X and 16 Y light wave input functions. Then again, such an array may contain as many as 250,000 X–Y intersection on-off circuits under the control of 500 X and 500 Y light wave input functions.

The light conducting fibers shown in FIGURE 1, and also in the remaining embodiments of this application, have been shown to be generally rectangular in cross sectional shape. It should be understood, however, that these fibers may be round, hexagonal, octagonal, or of any other desired shape.

In FIGURE 2, a light conducting fiber 11 is shown as having a layer of photoconductive material intimately joined to but one side of a predetermined portion of the outer surface of the fiber 11. This alternate method of adapting the PC layer 38 to receive light waves from the outer surface of the fiber 11 may be substituted for the method shown and described in connection with FIGURE 1. Conductors 39 and 40 are connected operatively to opposite ends thereof.

In FIGURE 3, still another method of adapting the PC layer to the light conducting fiber is shown. First and second fibers 41 and 42 are in different planes to define a crossing. Coincident with said crossing each filber 41 and 42 has disposed on its fire polished surface a layer of light transparent electrically conductive material 43 and 44. An example of a well known material that may be used for this purpose is a conductive material produced by Pittsburgh Plate Glass Company, under the trademark "NESA" transparent conductive material. Such material will hereinafter be referred to as "EC layer." The EC layers 43 and 44 of the respective fibers 41 and 42 are interconnected to form a good electrical connection at the point where the fibers 41 and 42 cross, and also to form a continuous electrical circuit between them, presenting outer surfaces at opposite ends thereof. A first PC layer 46 is connected operatively with an outer surface at one end of the interconnected EC layers 43 and 44, adjoining EC layer 43. A second PC layer 48 is connected operatively with an outer surface at the opposite end of the interconnected EC layers 43 and 44, adjoining EC layer 44.

The index of refraction of the EC layer is high relative to the index of refraction of the fiber, and the PC layers 46 and 48, respectively, are intimately joined with the surfaces of the EC layers 43 and 44. The PC layers 46 and 48 are thereby adapted to be illuminated selectively from the surfaces of their respective fibers 41 and 42, by means of the conduction of light waves from the surfaces of said fibers through the respective EC layers 43 and 44 to the PC layers 46 and 48. By connecting conductors 49 and 50 to the PC layers 46 and 48 this method of X–Y intersection on-off circuit control may be substituted for the method shown and described in connection with FIGURE 1.

Referring now to FIGURE 4, the basic concepts of the invention have been extended into a field of usefulness involving illumination control of electroluminescent materials in display panels. An array of light sensitive crossed-grid control circuits, of the type shown and described in conjunction with the embodiment of FIGURE 1, are included in a sandwich-like structure involving an electroluminescent layer containing electroluminescent phosphor particles dispersed in dielectric media, which will hereinafter be referred to as "EL layer." The structure comprises a transparent window 51, such as a plate of glass, Lucite, or the like; a first light transparent electrode 52, such as "NESA" material, to be referred to as an EC layer; an EL layer 53; first PC layers 20, 21, 22, etc.; first and second groups of paralleled angularly displaced fibers 11, 12, 13 etc.; second PC layers 24, 25, 26 etc.; and a second electrode 57. In operation, the above sandwich like structure will have a source of potential 58 and a switch means 59, as an example, connected between the first EC layer electrode 52 and the second electrode 57. The PC layers 20 and 26, 21 and 24, and all similarly related PC layers throughout the structure, are intimately joined at each X–Y intersection of the crossed-grid array of fibers 11, 12, etc. When light waves are permitted to enter the end surfaces 15 and 17 of the array, for example, an "on" circuit function of PC layers 21 and 24 will permit a potential influence of the source of potential 58 to be presented across the EL layer 53 within a limited area of its surface, or in the area adjacent the surface 61 of the PC layer 21.

If the fibers of the array of the structure of FIGURE 1, and also of FIGURE 4, are within an environment having a relatively low index of refraction, light waves entering the bend surfaces of the fibers, as described, will be conducted by internal reflections through the fibers to the PC layers. However, under those conditions where the environment is not conducive to this type of light conduction control, or when the fibers of an array are too close to prevent cross talk, a jacket of light conducting material having a relatively low index of refraction may be disposed upon and intimately joined with the polished outer surface of the fibers intermediate the PC layers. The use of transparent media 63, having a relatively low index of refraction, on the outer surfaces of the fibers 11, 12, 13 and 14 shown in the array of FIGURE 4, is an exemplification of the manner in which environmental difficulties or fiber spacing problems will be overcome.

Figure 5:
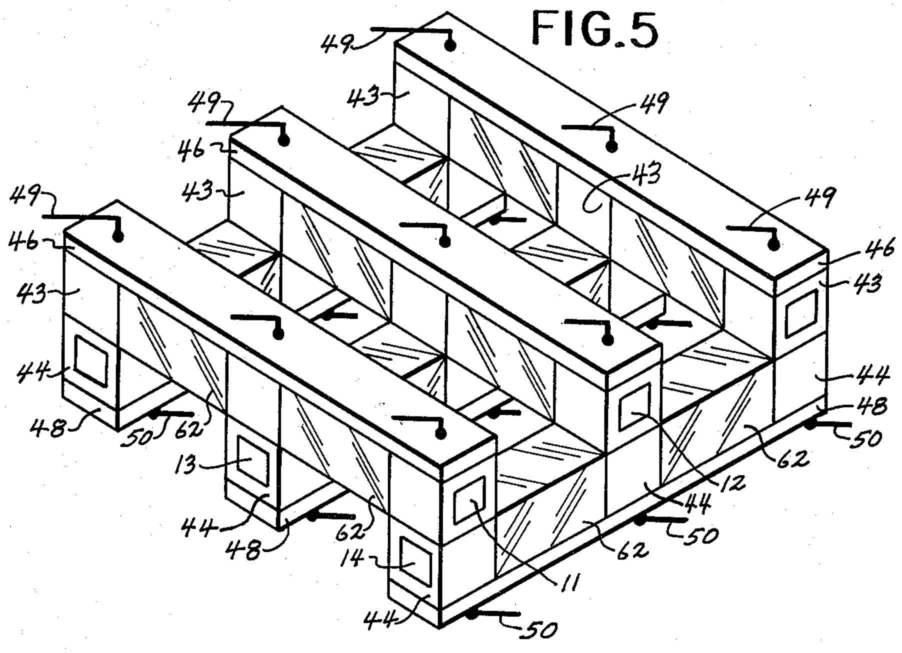
FIGURE 5 is a view in perspective of a further embodiment of the crossed-grid matrix control circuitry of FIGURE 1.

In FIGURE 5 a further embodiment of the invention is shown which utilizes the method shown and described in connection with FIGURE 3 of adapting the PC layer to the light conducting fiber. In this embodiment the fibers 11, 12, etc. of one plane and the fibers 13, 14, etc. of another plane have disposed upon their respective outer surfaces a jacket 62 of light conducting material having a relatively low index of refraction. The jacket 62 is intimately joined with the outer surfaces of the fibers intermediate the individual EC layers 43 and 44. The PC layers 46 and 48 of respective first and second group fibers are extended along the longitudinal dimension of the fibers 11, 12, etc. and 13, 14, etc. The PC layers 46 and 48 are adapted to be illuminated selectively from the surfaces of their respective fibers by means of light conduction from the surfaces of said fibers through the respective EC layers 43 and 44 to the PC layers 46 and 48. Intermediate EC layers 43 and 44 the jacket 62, having a low index of refraction relative to a high index of the fibers 11, 12, etc. and 13, 14, etc., will prevent illumination of the PC layers 46 and 48. Supplementary conductors 49 and 50 are connected operatively with the PC layers 46 and 48 of said first and second group fibers. The connections of conductors 49 are made adjacent EC layers 43, and connections of conductors 50 are made adjacent layers 44. These conductors 49 and 50 permit the array of light sensitive switches of this embodiment to be utilized as remotely located circuit control elements.

Figure 6:
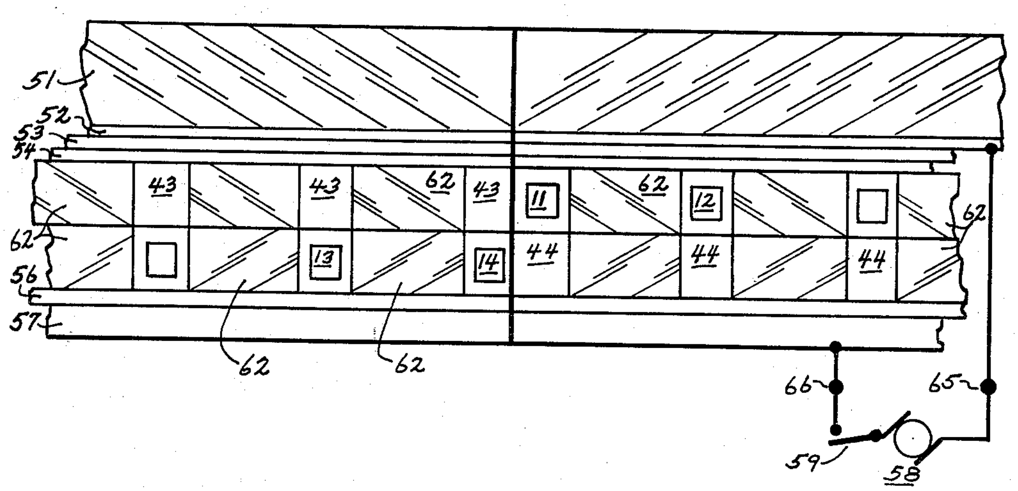
FIGURE 6 is a fragmentary corner elevation view of a display panel embodying the invention.

In FIGURE 6 the basic concepts of the invention have again been extended into an area involving data display panels. However, the method of adapting the PC layer to the light conducting fiber for the selective illumination thereof, is equal to that shown and described in conjunction with FIGURE 5. The display panel comprises a sandwich like structure which includes a window 51; an EC layer 52; an EL layer 53; a first PC layer 54; first and second groups of X and Y oriented fibers; a second PC layer 56; and a second electrode 57. A light transparent medium 62, having a low index of refraction relative to the index of the fibers 11, 12, 13, etc., is disposed upon the outer surface of the fibers and in the spaces between adjacent fibers. In operation, a source of potential 58 will be connected between the EC layer 52 and the second electrode 57. An on-off switch means 59 will also be provided. When light waves enter predetermined fibers of the sandwich like structure simultaneously, predetermined areas of the EL layer will be illuminated in a manner similar to the manner set forth in the description of FIGURE 4. The duration of the light output from EL layer 53 will be controlled by the on time of the applied potential.

Light feed-back from an EL layer 53 to non-illuminated photoconductive material may be controlled by the on time of the applied potential, or by placing an opaque layer of electrically resistant material between the EL layer 53 and the PC layers, or, with regard to the embodiment of FIGURE 4, undesirable light feedback from the EL layer 53 to adjacent PC layers which have not been illuminated may be controlled by adequate spacing between individual PC layers 20, 21, 22, 23, etc.

Although I have shown a source of potential 58 and an on-off switch means 59 as a means of presenting a potential influence across selected areas of the EL layer 53 upon the illumination of selected pairs of PC layers 20–26, 21–24, etc., the required potentials may be derived from a variety of other sources. The required potentials may be coupled to the sandwich like structure from a communications link, an electronic computer, or other data sources. In communications such potentials may be derived from a facsimile, or a television, transmitter. In any event, signals of the required type will be coupled to terminals 65 and 66, and synchronized with the generation of the necessary X and Y input functions. Terminals 65 and 66 are connected with EC layer 52 and electrode 57.

The intensity of the light output received from selected areas of the EL layer 53 will be a function of the magnitude of the signal potentials applied to the terminals 65 and 66, and applied in synchronism with the application of light waves to end surfaces 15, 16, etc. of the X and Y oriented fibers 11, 12, etc. and 13, 14, etc. Light waves incident to these end surfaces may be derived from numerous types of light wave generators, such as from the illuminated phosphor of a cathode ray tube, or from a series of electroluminescent phosphor light generators, or the like, all of which are known in the art.

It should, of course, be understood that many of the other embodiments embracing the general principles and constructions hereinbefore set forth, may be utilized and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:

1. An array of light-sensitive crossed-grid control circuits comprising:
   a plurality of first and second light conducting fibers each having
      a longitudinal dimension exceeding its cross sectional dimension,
      a transverse end presenting an end surface adapted to receive light waves incident to said end surface,
      an outer surface generally along its longitudinal dimension,
      a layer of photoconductive material and means by which said layer is joined with said outer surface and thereby adapted to be illuminated from said outer surface;
      said first fibers being adjacent said second fibers and angularly disposed in relation to said first fibers;
   and means by which said layers of said first fibers are connected operatively with said layers of said second fibers—whereby each connection of said layers provides a relatively high resistance series circuit in said layers dark resistance state and a relatively low resistance series circuit when light waves are received simultaneously by first and second fibers.

2. An array of light-sensitive crossed-grid control circuits comprising:
   a plurality of first and second light conducting fibers each having
      a longitudinal dimension exceeding its cross sectional dimension,
      a transverse end presenting an end surface adapted to receive light waves incident to said end surface,
      an outer surface generally along its longitudinal dimension,
      individual layers of photoconductive material and means by which said layers are joined with predetermined portions of said outer surface and thereby adapted to be illuminated from said outer surface;
      said first fibers being adjacent said second fibers and angularly displaced in relation to said first fibers;
   and means by which said individual layers of said first fibers are connected operatively with said individual layers of said second fibers—whereby each connected pair of said layers provides a relatively high resistance series circuit in their dark resistance state and a relatively low resistance series circuit when light waves are received simultaneously by predetermined first and second fibers.

3. An array of light-sensitive crossed-grid control circuits comprising:
   first and second groups of light conducting fibers in different planes and defining between them a plurality of fiber crossings;
   said light conducting fibers each having
      a longitudinal dimension exceeding its cross sectional dimension,
      a transverse end presenting an end surface adapted to receive light waves incident to said end surface,
      an outer surface generally along its longitudinal dimension,
      individual layers of photoconductive material intimately joined with portions of said outer surface coincident with said fiber crossings adapted to be illuminated selectively from said outer surface;
   said individual layers of said first group of fibers being connected operatively with said individual layers of said second group of fibers—whereby each interconnected pair of individual layers provides a relatively high resistance series circuit in their dark resistance state and a relatively low resistance series circuit when light waves are received simultaneously by first and second group fibers.

4. An array of light-sensitive crossed-grid control circuits comprising:

first and second groups of light conducting fibers in different planes and defining between them a plurality of crossings;

said light conducting fibers each having a longitudinal dimension exceeding its cross sectional dimension, a transverse end presenting an end surface adapted to receive light waves incident to said end surface, an outer surface generally along its longitudinal dimension, individual layers of light transparent electrically conductive material presenting an outer surface and intimately joined with portions of said outer surface along its longitudinal dimension coincident with said fiber crossings, and a layer of photoconductive material intimately joined with the outer surface of said transparent conductor layers;

said individual transparent conductor layers of said first group of fibers being interconnected with said individual transparent conductor layers of said second group of fibers;

and said photoconductor layers of said first group of fibers being interconnected with said photoconductor layers of said second group of fibers coincident with said fiber crossings—whereby at each fiber crossing the interconnected photoconductor layers provide a relatively high resistance series circuit in their dark resistance state and a relatively low resistance series circuit when light waves are received simultaneously by first and second group fibers.

5. The invention as set forth in claim 4 additionally including, said light conducting fibers each having a relatively high index of refraction;

and a jacket of light conducting material having a relatively low index of refraction intimately joined with said fibers intermediate said individual layers of light transparent electrically conductive material.

6. The invention as set forth in claim 3 additionally including, said light conducting fibers each having a relatively high index of refraction;

and a jacket of light conducting material having a relatively low index of refraction intimately joined with said fibers intermediate said individual layers of photoconductive material.

7. The invention as set forth in claim 4 additionally including, an electroluminescent layer adjacent the photoconductive layers of said first group of fibers;

a first electrode adjacent said electroluminescent layer;

and a second electrode adjacent said photoconductive layers of the second group of fibers;

said first and second electrodes being adapted to extend the influence of an electrostatic potential across said electroluminescent layer upon the admission of light waves to fibers of said first and second groups.

8. The invention as set forth in claim 3 additionally including, an electroluminescent layer adjacent said individual layers of photoconductive material of said first group of fibers;

a first electrode with means for applying a voltage thereto adjacent said electroluminescent layer;

and a second electrode with means for applying a voltage thereto adjacent said individual layers of photoconductive material of said second group of fibers.

References Cited by the Examiner

UNITED STATES PATENTS

| | | | |
|---|---|---|---|
| 2,695,964 | 11/54 | Schepker | 250—80 |
| 2,874,308 | 2/59 | Livington | 250—213 |
| 2,907,001 | 9/59 | Loebner | 250—213 |
| 2,999,165 | 9/61 | Lieb | 250—213 |
| 3,037,189 | 5/62 | Barrett et al. | 315—169 |
| 3,056,031 | 9/62 | McNaney | 250—227 X |

RALPH G. NILSON, *Primary Examiner.*

ARCHIE R. BORCHELT, *Examiner.*